(12) United States Patent
Wang

(10) Patent No.: US 8,191,919 B2
(45) Date of Patent: Jun. 5, 2012

(54) LOCKING DEVICE FOR A STROLLER

(75) Inventor: Chih-Wei Wang, Taipei (TW)

(73) Assignee: Excellerate Enterprise Co., Ltd., Taipei (TW)

( * ) Notice: Subject to any disclaimer, the term of this patent is extended or adjusted under 35 U.S.C. 154(b) by 861 days.

(21) Appl. No.: 11/819,185

(22) Filed: Jun. 26, 2007

(65) Prior Publication Data
US 2008/0030005 A1    Feb. 7, 2008

(30) Foreign Application Priority Data

Aug. 7, 2006  (CN) .................. 2006 2 0129473 U

(51) Int. Cl.
*B62B 7/06* (2006.01)

(52) U.S. Cl. .................. 280/649; 280/642; 280/650

(58) Field of Classification Search .................. 280/42, 280/642, 644, 647, 649, 650, 657, 658; 297/45
See application file for complete search history.

(56) References Cited

U.S. PATENT DOCUMENTS

| | | | | |
|---|---|---|---|---|
| 4,152,010 A * | 5/1979 | Kassai | ............ | 280/650 |
| 4,266,807 A * | 5/1981 | Griffin | ............ | 280/650 |
| 4,648,651 A * | 3/1987 | Hawkes | ............ | 297/45 |
| 5,221,106 A * | 6/1993 | Shamie | ............ | 280/644 |
| 5,288,098 A * | 2/1994 | Shamie | ............ | 280/642 |
| 6,422,586 B1 * | 7/2002 | Glover | ............ | 280/647 |
| 6,811,178 B2 * | 11/2004 | Tomasi et al. | ............ | 280/650 |
| 6,814,368 B2 * | 11/2004 | Cheng | ............ | 280/642 |

FOREIGN PATENT DOCUMENTS

| | | |
|---|---|---|
| EP | 1232927 A3 | 8/2002 |
| EP | 1614605 A1 | 1/2006 |
| EP | 1733948 A2 | 12/2006 |
| EP | 1762457 A2 | 3/2007 |
| GB | 2710928 A | 8/2005 |

* cited by examiner

*Primary Examiner* — J. Allen Shriver, II
*Assistant Examiner* — Bridget Avery
(74) *Attorney, Agent, or Firm* — Bacon & Thomas, PLLC

(57) ABSTRACT

A locking device for a stroller is provided. The stroller includes a pair of side frames and a base frame. The locking device comprises an articulated mechanism pivotally connected between the respective rear frames of the pair of side frames, a locking member slidably provided on the articulated mechanism for locking the articulated mechanism, and a pair of side braces pivotally connected to the locking member at one end thereof respectively and pivotally connected to the respective rear frames of the pair of side frames at the other end thereof. The folding and unfolding of the stroller can be easily carried out by means of the locking device.

11 Claims, 13 Drawing Sheets

LOCKING DEVICE FOR A STROLLER

BACKGROUND OF THE INVENTION

1. Field of the Invention

The present invention relates to a locking device for a stroller.

2. Description of Related Arts

In prior arts, many locking devices for a stroller are known. Due to the complex configuration of such locking devices, operation is inconvenient and locking devices are failed frequently.

For example, U.S. Pat. No. 6,811,178 discloses an umbrella-type folding frame. The folding frame comprises a pair of front upper and lower struts, a pair of rear struts, at least one lock-release mechanism disposed between each of the upper struts and the lower struts, an articulated connection structure, and a driving device for controlling the lock-release mechanism. The operation of unfolding or folding the frame is carried out by the complicated combination of the lock-release mechanism, the driving device and so forth.

SUMMARY OF THE INVENTION

Accordingly, it is an object of the present invention to provide a locking device for a stroller that overcomes the problem with the aforementioned prior art.

In accordance with one aspect of the present invention, a locking device for a stroller is provided, the stroller including a pair of side frames and a base frame, each of the side frames including a front upper frame, a front lower frame pivotally connected to the lower end of the front upper frame at the upper end thereof, a rear frame pivotally connected to the front upper frame at the upper end thereof, and a side connecting frame pivotally connected between the front lower frame and the rear frame, the base frame being pivotally connected between the pair of side frames, the locking device comprising: an articulated mechanism pivotally connected between the respective rear frames of the pair of side frames; a locking member slidably provided on the articulated mechanism for locking the articulated mechanism; and a pair of side braces pivotally connected to the locking member at one end thereof respectively and pivotally connected to the respective rear frames of the pair of side frames at the other end thereof, wherein the articulated mechanism includes a pair of upper braces, a pair of lower braces and a vertical brace, the pair of upper braces being pivotally connected to each other at one end thereof and pivotally connected to the respective rear frames of the pair of side frames at the other end thereof, the pair of lower braces being substantially parallel to the pair of upper braces and pivotally connected to each other at one end thereof and pivotally connected to the respective rear frames of the pair of side frames at the other end thereof, and the vertical brace being pivotally connected to the ends of the pair of upper braces at the upper end thereof and pivotally connected to the ends of the pair of lower braces at the lower end thereof, wherein the locking member is slidably provided on the vertical brace of the articulated mechanism, and has a latch that is abutted against an upper end of the vertical brace of the articulated mechanism, and wherein the latch is flexible and is operative to remove from the upper end of the vertical brace of the articulated mechanism.

Preferably, the locking device further comprises a handle both ends of which are fixed to the pair of upper braces respectively.

Preferably, the locking member has a longitudinal body with a tapered upper portion, the latch is located on the upper portion, and the locking device has a recess below the latch for pivotally connecting the pair of upper braces and the vertical brace.

In accordance with another aspect of the present invention, a locking device for a stroller is provided, the stroller including a pair of side frames and a base frame, each of the side frames including a front upper frame, a front lower frame pivotally connected to the lower end of the front upper frame at the upper end thereof, a rear frame pivotally connected to the front upper frame at the upper end thereof, and a side connecting frame pivotally connected between the front lower frame and the rear frame, the base frame being pivotally connected between the pair of side frames, the locking device comprising: an articulated mechanism pivotally connected between the respective rear frames of the pair of side frames; a locking member slidably provided on the articulated mechanism for locking the articulated mechanism; and a pair of side braces pivotally connected to the locking member at one end thereof respectively and pivotally connected to the respective rear frames of the pair of side frames at the other end thereof, wherein the articulated mechanism includes a pair of upper braces, a pair of lower braces and a vertical brace, the pair of upper braces being pivotally connected to each other at one end thereof and pivotally connected to the respective rear frames of the pair of side frames at the other end thereof, the pair of lower braces being substantially parallel to the pair of upper braces and pivotally connected to each other at one end thereof and pivotally connected to the respective rear frames of the pair of side frames at the other end thereof, and the vertical brace being pivotally connected to the ends of the pair of upper braces at the upper end thereof and pivotally connected to the ends of the pair of lower braces at the lower end thereof, wherein the locking device further comprises an operating member having a protrusion, wherein the locking member is slidably provided on the vertical brace of the articulated mechanism, and has a latch that is abutted against the protrusion of the operating member of the articulated mechanism, and wherein the latch is flexible and is operative to remove from the protrusion of the vertical brace of the articulated mechanism.

Preferably, the locking device further comprises a handle both ends of which are pivotally connected to both sides of the operating member.

Preferably, the operating member has a recess that is integrally formed with a grip.

In accordance with another aspect of the present invention, a locking device for a stroller is provided, the stroller including a pair of side frames each including a rear frame, the locking device being located between the two rear frames, the locking device comprising: an articulated mechanism pivotally connected between the respective rear frames of the pair of side frames; and a locking member slidably provided on the articulated mechanism, the locking member having a latch for blocking the articulated mechanism to prevent the articulated mechanism from moving relative to the locking member, wherein the latch is flexible and is operative to remove from the articulated mechanism to move the locking device with respective to the articulated mechanism such that the pair of side frames are close to each other.

Preferably, the articulated mechanism includes a pair of upper braces, a pair of lower braces and a vertical brace, the pair of upper braces being pivotally connected to each other at one end thereof and pivotally connected to the respective rear frames of the pair of side frames at the other end thereof, the pair of lower braces being substantially parallel to the pair of upper braces and pivotally connected to each other at one end thereof and pivotally connected to the respective rear frames of the pair of side frames at the other end thereof, and the vertical brace being pivotally connected to the ends of the pair of upper braces at the upper end thereof and pivotally connected to the ends of the pair of lower braces at the lower end thereof, and the locking member is slidably provided on the vertical brace of the articulated mechanism.

Preferably, the latch is flexible and is operative to remove from the articulated mechanism to move the locking device with respective to the articulated mechanism such that the pair of side frames are close to each other.

In accordance with another aspect of the present invention, a locking device for a stroller is provided, the stroller including a pair of side frames each including a rear frame, the locking device being located between the two rear frames, the locking device comprising: an articulated mechanism pivotally connected between the respective rear frames of the pair of side frames; and a locking member slidably provided on the articulated mechanism, the locking member having a latch for blocking the articulated mechanism to prevent the articulated mechanism from moving relative to the locking member, wherein the locking member has a longitudinal body with a tapered upper portion, the latch is located on the upper portion, and the locking device has a recess below the stpper for pivotally connecting the pair of upper braces and the vertical brace, and wherein the latch is flexible and is operated to remove from the articulated mechanism to move the locking device with respective to the articulated mechanism such that the pair of side frames are close to each other.

Preferably, the articulated mechanism includes a pair of upper braces, a pair of lower braces and a vertical brace, the pair of upper braces being pivotally connected to each other at one end thereof and pivotally connected to the respective rear frames of the pair of side frames at the other end thereof, the pair of lower braces being substantially parallel to the pair of upper braces and pivotally connected to each other at one end thereof and pivotally connected to the respective rear frames of the pair of side frames at the other end thereof, and the vertical brace being pivotally connected to the ends of the pair of upper braces at the upper end thereof and pivotally connected to the ends of the pair of lower braces at the lower end thereof, and the locking member is slidably provided on the vertical brace of the articulated mechanism.

In accordance with another aspect of the present invention, a locking device for a stroller is provided, the stroller having a pair of side frames, the locking device being pivotally connected to the side frames and comprising: an articulated mechanism pivotally connected between the pair of side frames; and a locking member slidably mounted on the articulated mechanism, the locking member having a flexible latch which is selectively moved between a first position where the latch stops the articulated mechanism from moving and the pair of side frames are spaced apart from each other, and a second position where the articulated mechanism is freely moved relative to the locking member and the side frames are able to be close to each other.

Preferably, the articulated mechanism includes a pair of braces pivotally connected to each other at one end thereof and pivotally connected to the respective one of the pair of side frames at the other end thereof, and a vertical brace pivotally connected to the ends of the pair of braces and having an upper end, the locking member is slidably provided on the vertical brace of the articulated mechanism and the latch is abutted against the upper end of the vertical brace when the latch is in the first position.

Preferably, the upper end of the vertical brace is mounted on an operating member, and the latch is abutted against a protrusion on a top end of the operating member.

Preferably, the locking member has a longitudinal body with a tapered upper portion, the latch is located on the upper portion, and the locking device has a recess below the latch to retain the ends of the pair of braces and the upper end of the vertical brace therein while the latch is in the first position.

BRIEF DESCRIPTION OF THE DRAWINGS

These and other features, aspects and advantages of the present invention will become more apparent from the following description, appended claims, and accompanying exemplary embodiments shown in the drawings, which are briefly described below.

DETAIL DESCRIPTION OF THE PREFERRED EMBODIMENT

A locking device for a stroller according to embodiments of the present invention will be described below with reference to the drawings.

Figure 1:
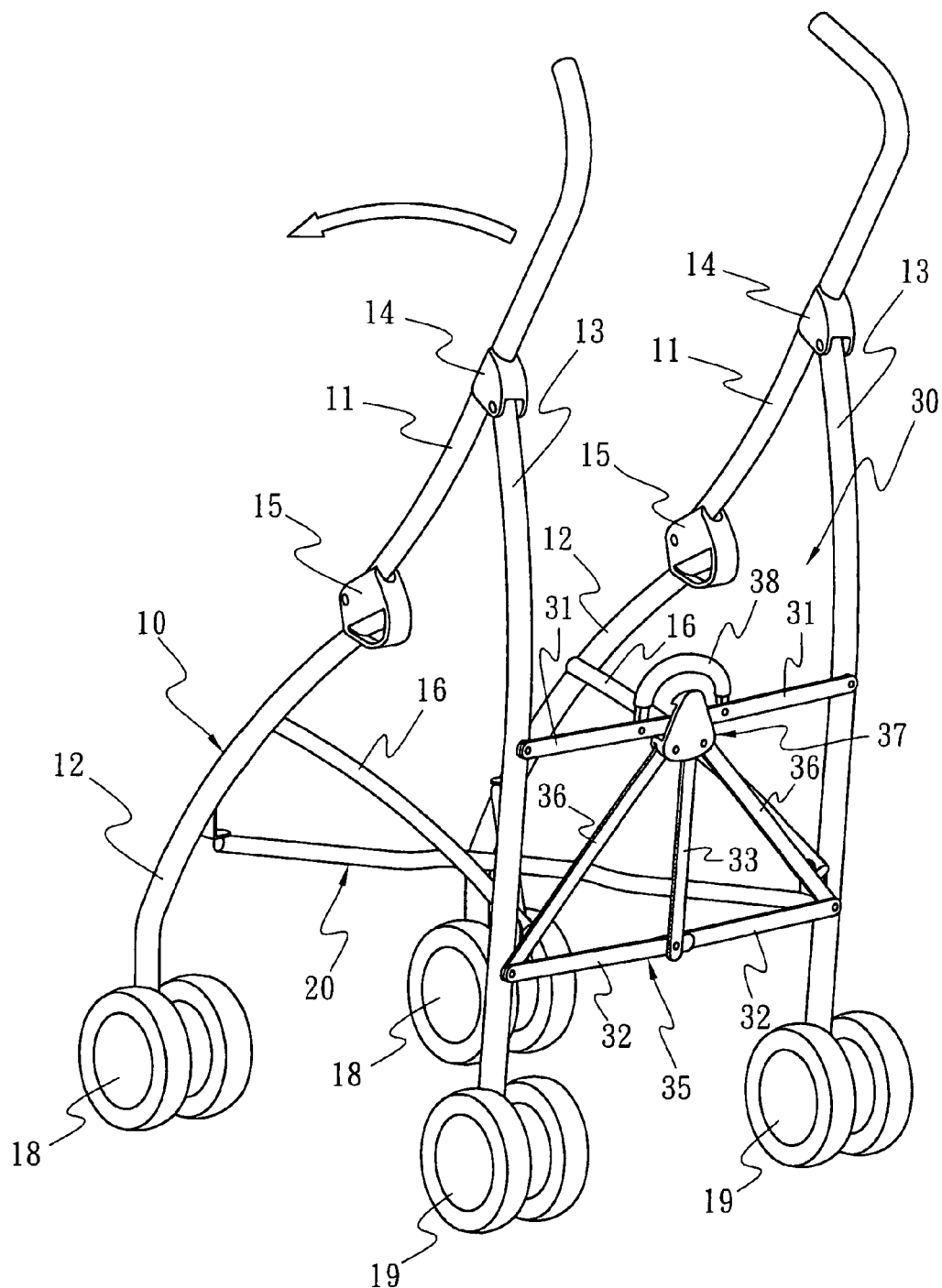
FIG. 1 is a perspective view showing a stroller provided with a locking device according to a first embodiment of the present invention when the stroller is in an operation state.

As shown in FIG. 1, the stroller comprises a pair of side frames 10 and a base frame 20. A locking device 30 according to a first embodiment of the present invention is provided on the stroller.

Each of the side frames 10 includes a front upper frame 11, a front lower frame 12, a rear frame 13 and a side connecting frame 16. In the side frame 10, the front upper frame 11 is pivotally connected to a first pivot member 15 fixed on the upper end of the front lower frame 12. The front lower frame 12 is provided at the lower end thereof with a wheel 18. The upper end of the rear frame 13 is pivotally connected to a second pivot member 14 fixed to the front upper frame 11, and the lower end thereof is provided with a wheel 19. The side connecting frame 16 is pivotally connected to the front lower frame 12 and the rear frame 13.

In this embodiment, the base frame 20 is consisted of two rods intersecting and pivotally connecting one to the other, both ends of which are pivotally connected to the front lower frame 12 and the rear frame 13 of each of the side frames 10 respectively.

Figure 2:
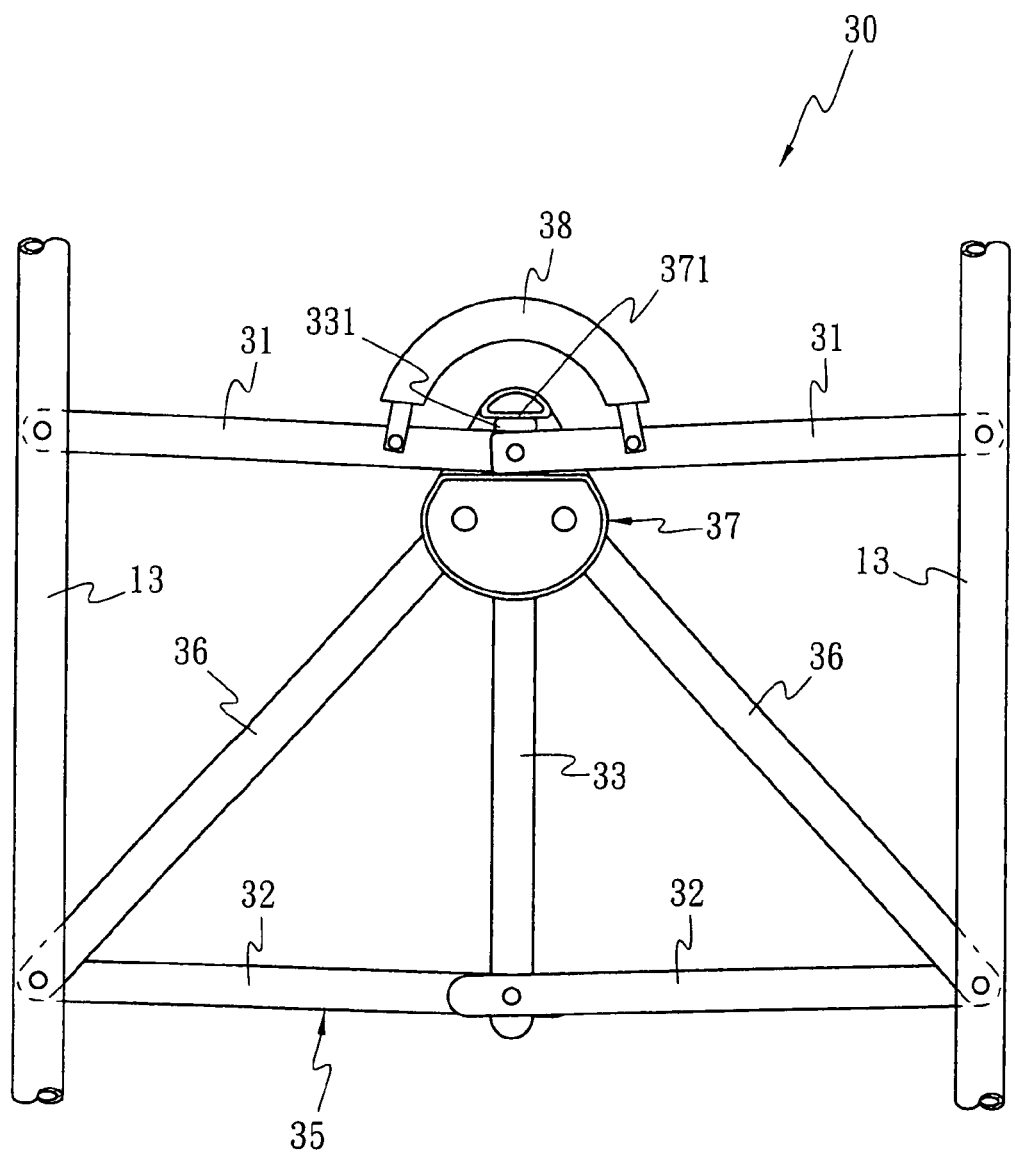
FIG. 2 is a partial front view of the stroller in FIG. 1.
Figure 3:
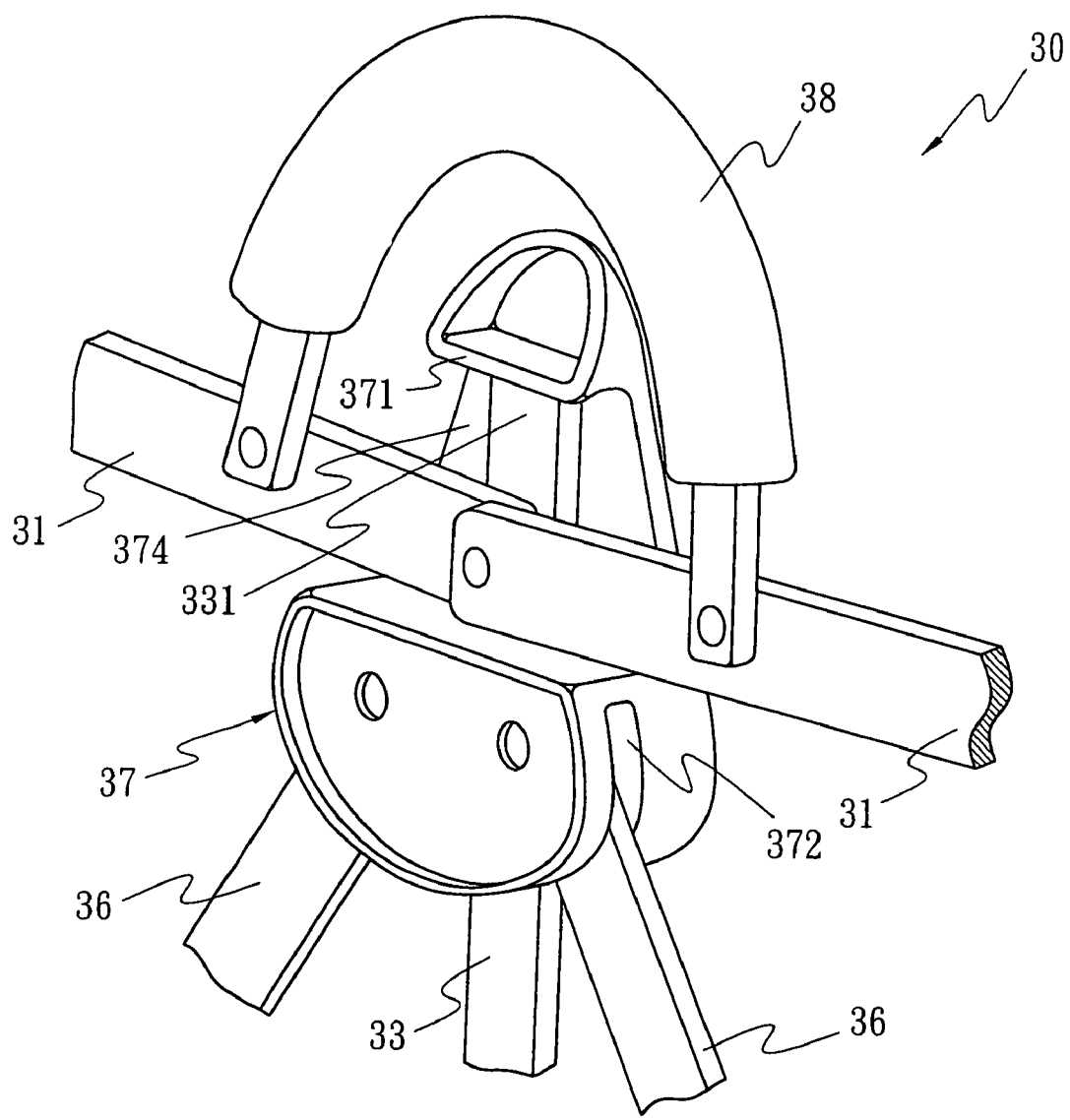
FIG. 3 is a partially enlarged view of the locking device for the stroller according to the first embodiment of the present invention.
Figure 4:
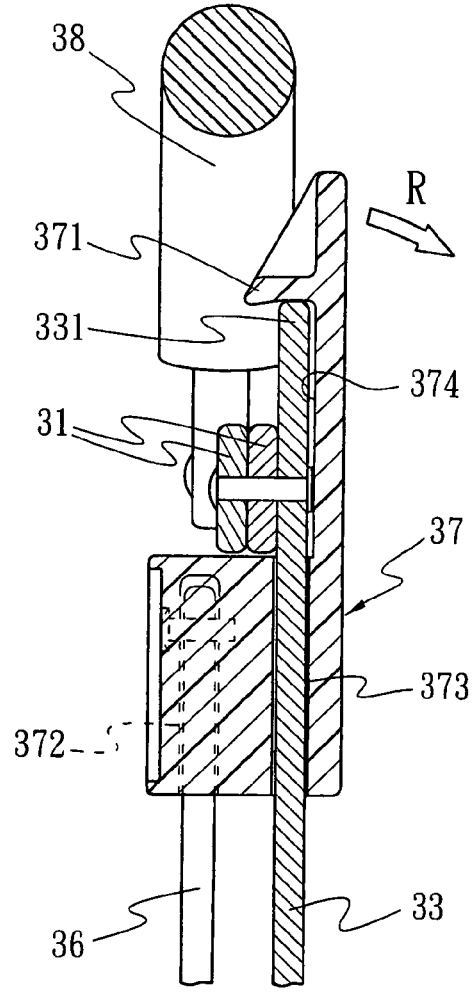
FIG. 4 is a side sectional view of the locking device for the stroller according to the first embodiment of the present invention while being in a locked state.
Figure 6:
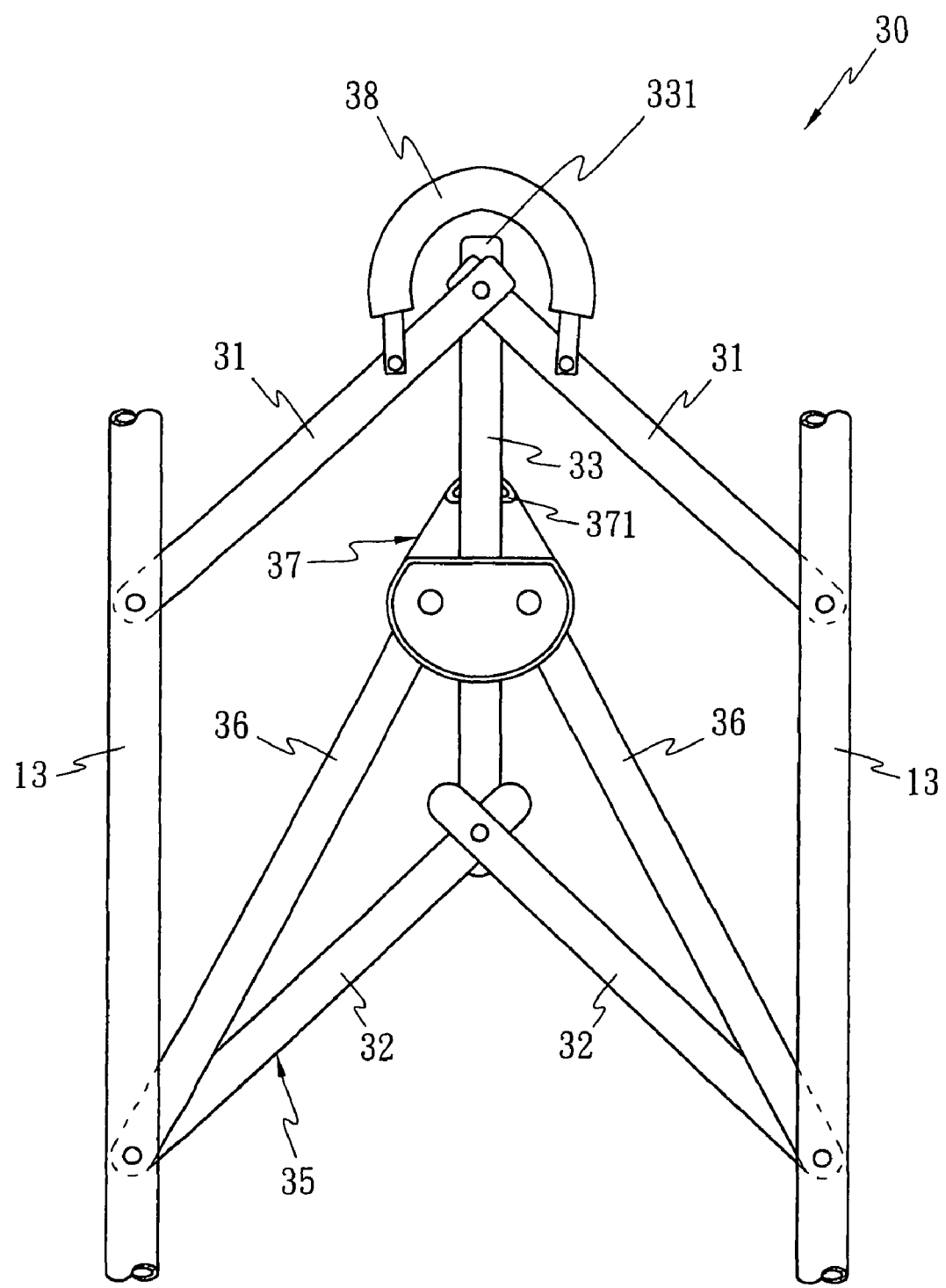
FIG. 6 is a partially front view showing the stroller in FIG. 1 while being in a semi-folded state.

As shown in FIGS. 2 and 3, the locking device 30 includes an articulated mechanism 35, a locking member 37, a pair of side braces 36 and a handle 38. The articulated mechanism 35 includes a pair of upper braces 31, the upper braces 31 being pivotally connected to each other at one end thereof and pivotally connected to the respective rear frames 13 of the pair of side frames 10 at the other end thereof; a pair of lower braces 32 substantially in parallel to the upper braces 31, the lower braces 32 being pivotally connected to each other at one end thereof and pivotally connected to the respective rear frames 13 of the pair of side frames 10 at the other end thereof; and a vertical brace 33, the vertical brace 33 being pivotally connected to the pivot point of the pair of upper braces 31 at the upper end thereof and pivotally connected to the pivot point of the pair of lower braces 32 at the lower end thereof. In this embodiment, the locking member 37 having substantially a fan-shaped body, includes a flexible latch 371 located in the upper tapered end portion thereof, a recess 374 located in the middle portion thereof, a through hole 373 located in the center of the lower portion thereof and having spatial communication with the recess 374, and a pair of slots 372 located on both sides of the lower portion thereof. As shown in FIG. 4, the pair of side braces 36 are pivotally connected to the respective slot 372 of the locking member 37 at the upper end thereof, and pivotally connected to the pivot point of the respective lower brace 32 and rear frame 13. Both ends of the handle 38 are fixed to the pair of upper braces 31 respectively.

As shown in FIGS. 3 and 4, in the locking device 30, the vertical brace 33 passes through the through hole 373 of the locking member 37 such that the locking member 37 is slidably provided on the vertical brace 33. When the stroller is in an operation state (see FIG. 4), the pivot portion of the pair of upper braces 31 and the vertical brace 33 is received in the recess 374 of the locking member 37, such that the latch 371 of the locking member 37 is abutted against the upper end 331 of the vertical brace 33 to retain the locking device 30 in a locked state. Since the upper end 331 of the vertical brace 33 is retained in the recess 374 by the latch 371, the stroller is prevented from folding.

Figure 5:
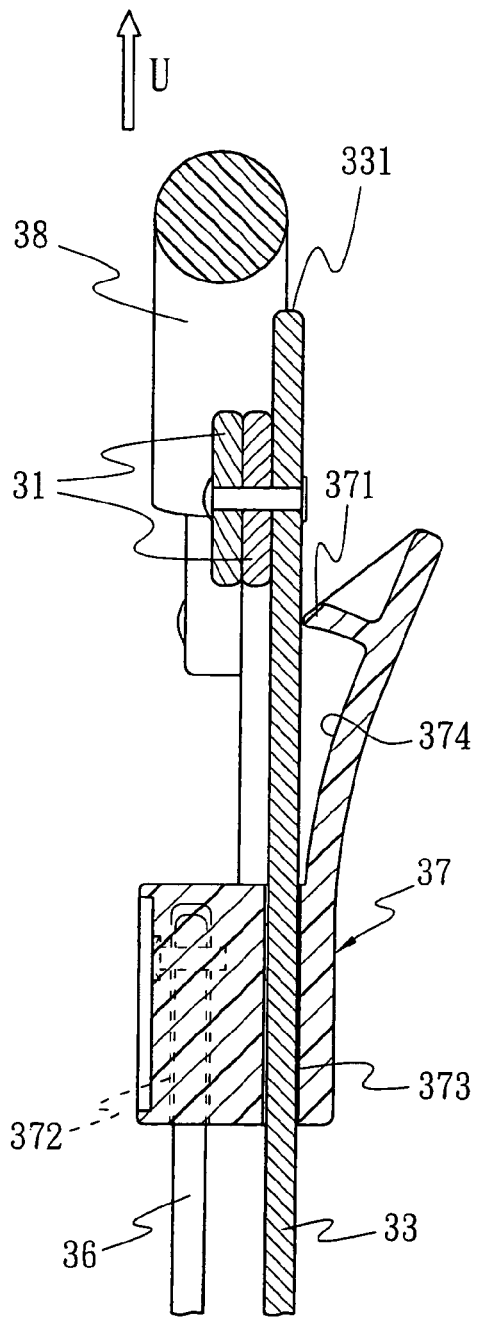
FIG. 5 is a side sectional view of the locking device for the stroller according to the first embodiment of the present invention while being in an unlocked state.

When the stroller is intended to be folded, a user can press the latch 371 of the locking member 37 toward a direction designated by an arrow R shown in FIG. 4 to move the latch 371 of the locking member 37 away from the upper end 331 of the vertical brace 33, and raise the handle 38 toward a direction designated by an arrow U shown in FIG. 5 to enable the pivot point of the pair of upper braces 31 and the pivot point of the pair of lower braces 32 to move upward as well as the two rods of the base frame 20 to be pivoted relative to each other (not shown), thereby enabling the pair of side frames 10 to be close to each other. In the meantime, the second pivot member 14 is pivoted relative to the front lower frame 12 about the first pivot member 15, such that the rear frame 13 is pivoted relative to the front upper frame 11 about the second pivot member 14, thereby enabling the front upper frame 11, the front lower frame 12 and the rear frame 13 to be approached to each other while the stroller is in a completely folded state as shown in FIG. 7.

Figure 7:
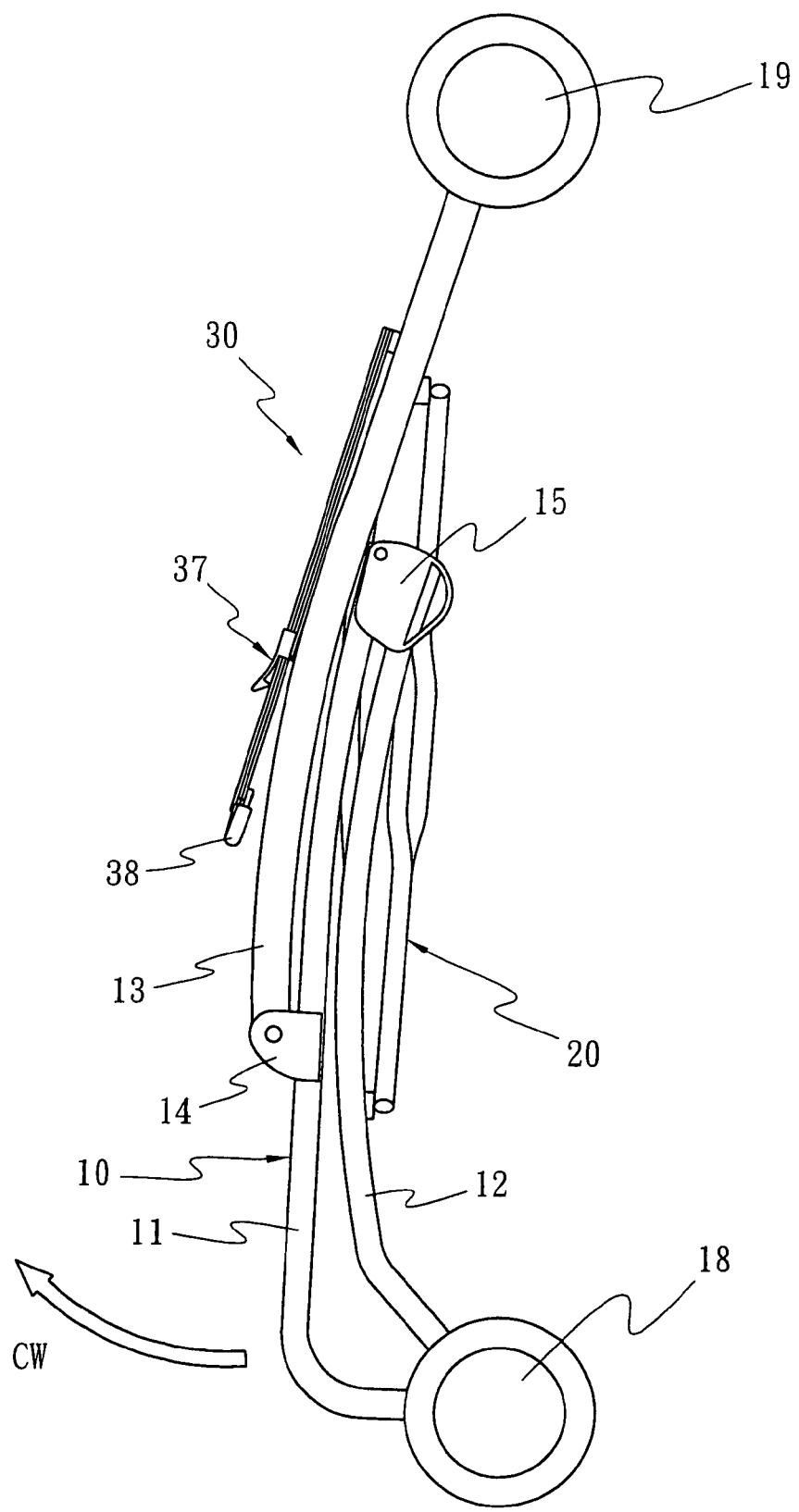
FIG. 7 is a side view shown showing the stroller in FIG. 1 while being in a completely folded state.

When the stroller is intended to be unfolded, the front upper frame 11 is pivoted in a clockwise direction CW as shown in FIG. 7 and the pair of side frames 10 are moved away from each other, such that the stroller is in an operation state and the upper end 331 of the vertical brace 33 is abutted against the latch 371 of the locking member 37.

Figure 8:
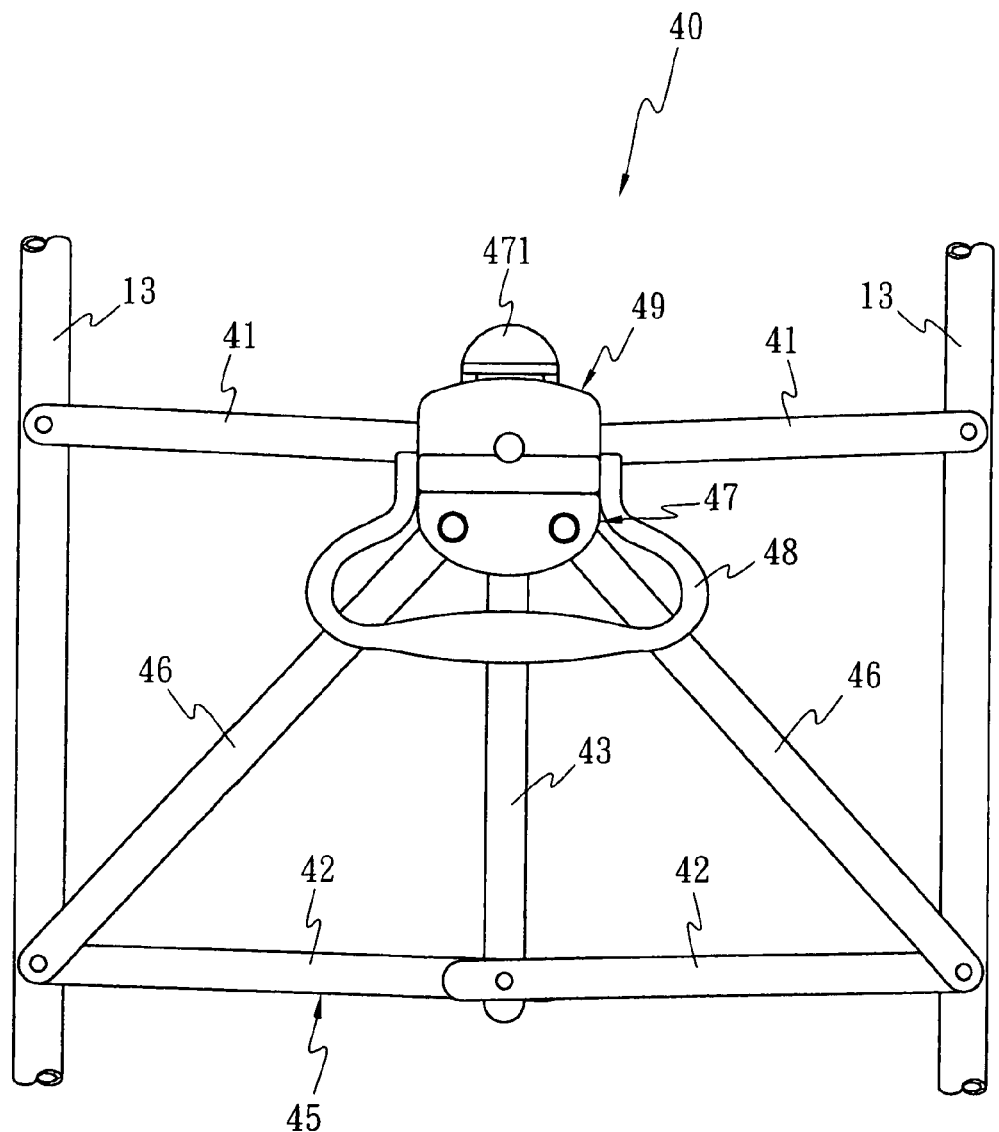
FIG. 8 is a partial rear view showing a stroller provided with a locking device according to a second embodiment of the present invention while being in an operation state.

Next, a locking device for a stroller according to a second embodiment of the present invention will be explained in reference to FIGS. 8 to 12. The stroller used in the second embodiment is identical to that of the first embodiment, and thus the description thereof is omitted. FIG. 8 is a partial rear view showing the stroller provided with the locking device according to the second embodiment of the present invention, in an operation state.

Figure 9:
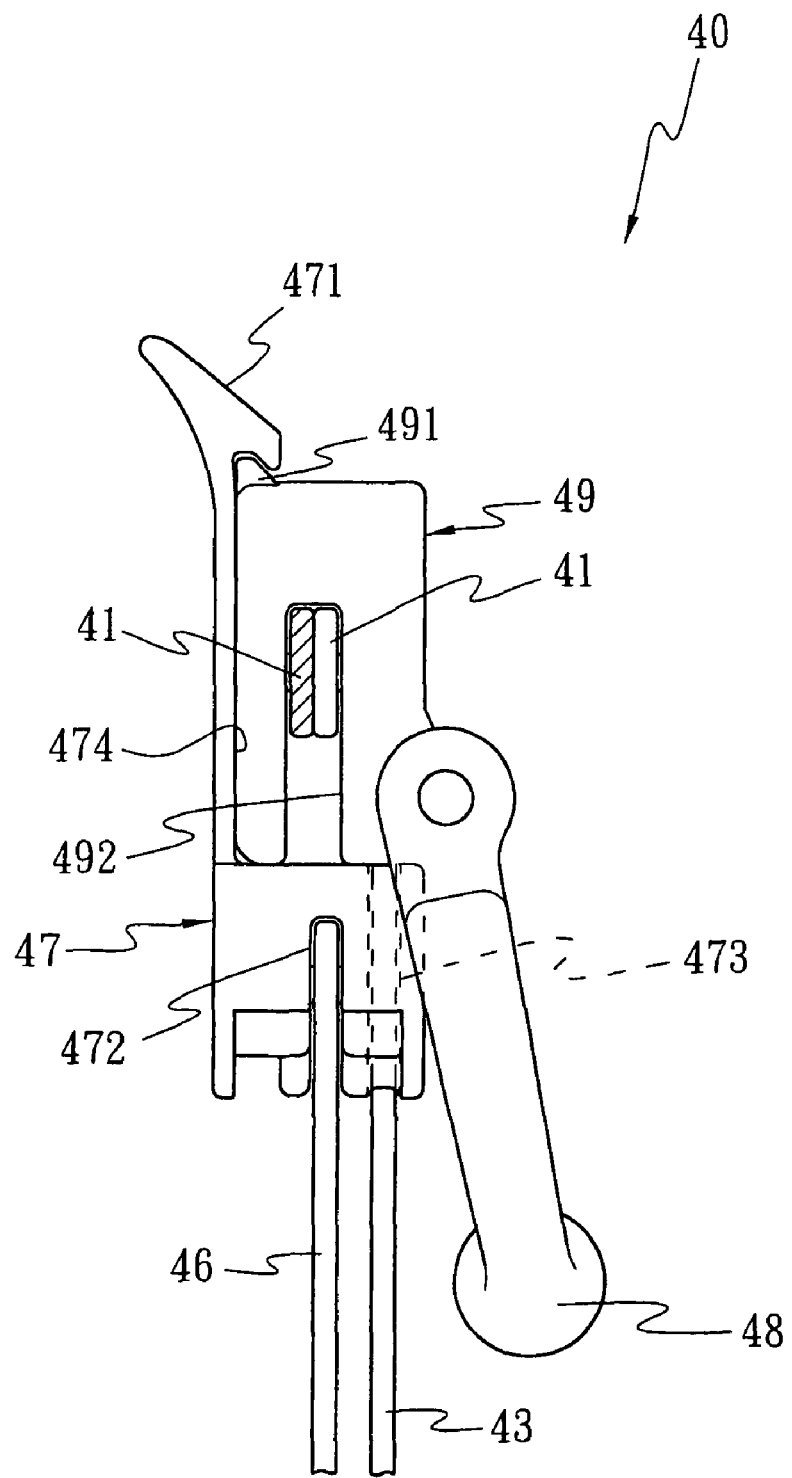
FIG. 9 is a partial side view showing the locking device for the stroller according to the second embodiment of the present invention while being in a locked state.

As shown in FIG. 8, a locking device 40 according to the second embodiment of the present invention includes an articulated mechanism 45, a locking member 47, a pair of side braces 46 and a handle 48. The articulated mechanism 45 includes an operating member 49; a pair of upper braces 41, the upper braces 41 being pivotally connected to the operating member 49 at one end thereof and pivotally connected to the respective rear frames 13 of the pair of side frames 10 at the other end thereof; a pair of lower braces 42 substantially in parallel to the upper braces 41, the lower frames being pivotally connected to each other and pivotally connected to the respective rear frames 13 of the pair of side frames 10 at the other end thereof; and a vertical brace 43, the vertical brace 43 being fixed to the operating member 49 at one end thereof and pivotally connected to the pivot point of the pair of lower braces 42 at the other end thereof. As shown in FIG. 9, the operating member 49 has a protrusion 491 on the upper portion thereof, and a slot 492 on the lower portion thereof for receiving and pivotally connecting the pivot point of the pair of upper braces 41. In this embodiment, the locking member 47 having substantially a longitudinal body with tapered upper portion, includes a flexible latch 471 located in the upper portion thereof for blocking the protrusion 491 of the operating member 49, a recess 474 located in the middle portion thereof for receiving the operating member 49, a through hole 473 located in the center of the lower portion thereof and vertically penetrating the recess 474, and a pair of slots 472 located on both sides of the lower portion thereof. The pair of side braces 46 are pivotally connected to the respective slots 472 of the locking member 47 at the upper end thereof (see FIG. 11), and pivotally connected to the pivot point of the respective lower braces 42 and rear frames 13 at the lower end thereof (see FIG. 8). The handle 49 is made of a hard material, and both ends thereof are pivotally connected to the left and right sides of the operating member 49 respectively.

As shown in FIG. 9, in the locking device 40, the vertical brace 43 passes through the through hole 473 of the locking member 47 such that the locking member 47 is slidably provided on the vertical brace 43. When the stroller is in the state of complete unfolding (see FIG. 9), the operating member 49 is received in the recess 474 of the locking member 47, such that the latch 471 of the locking member 47 retains the protrusion 491 of the operating member 49. Since the protrusion 491 of the operating member 49 is retained by the latch 471, the stroller is prevented from folding.

Figure 10:
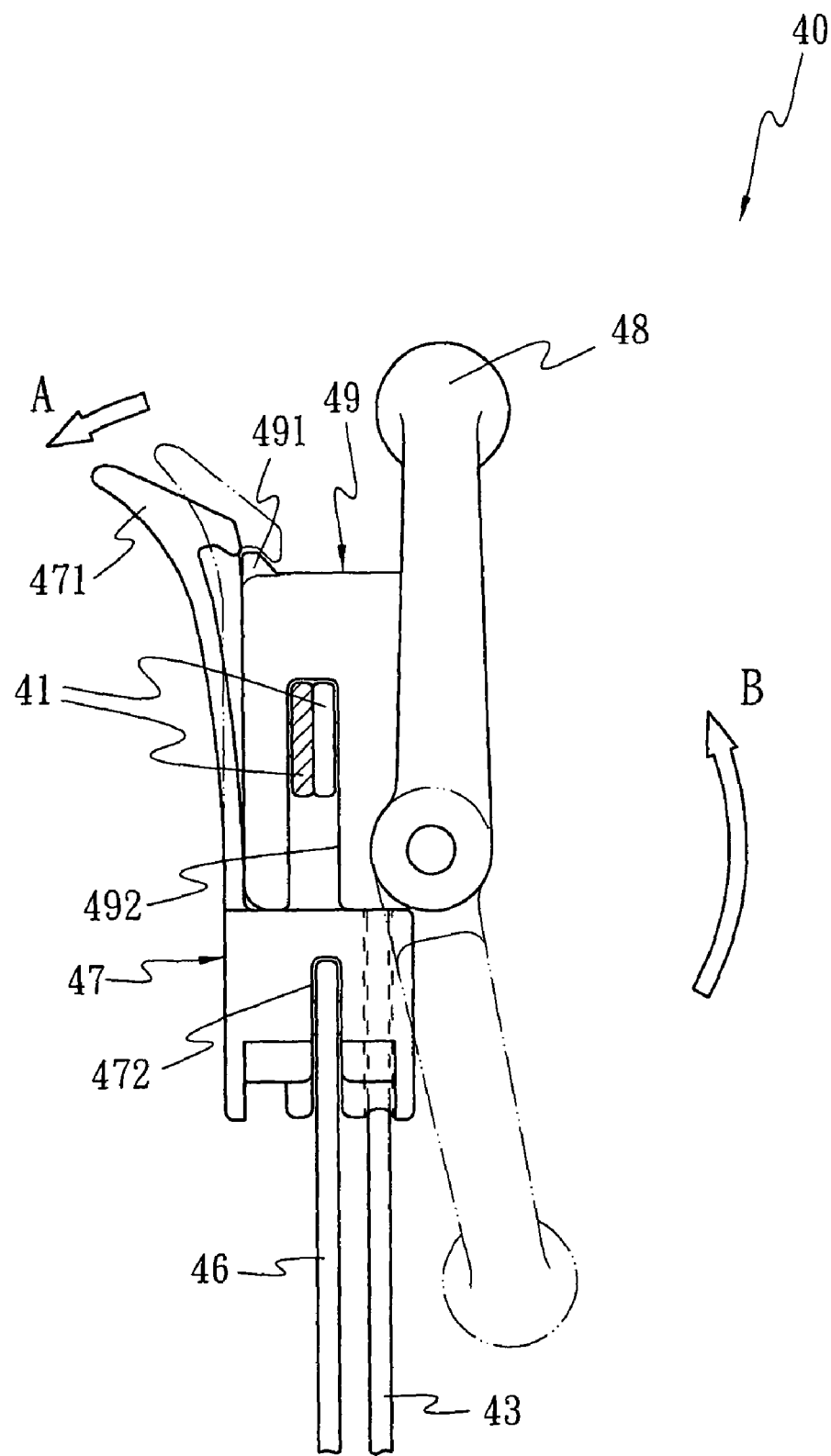
FIG. 10 is a partial side view showing the locking device for the stroller according to the second embodiment of the present invention while being in an unlocked state.
Figure 11:
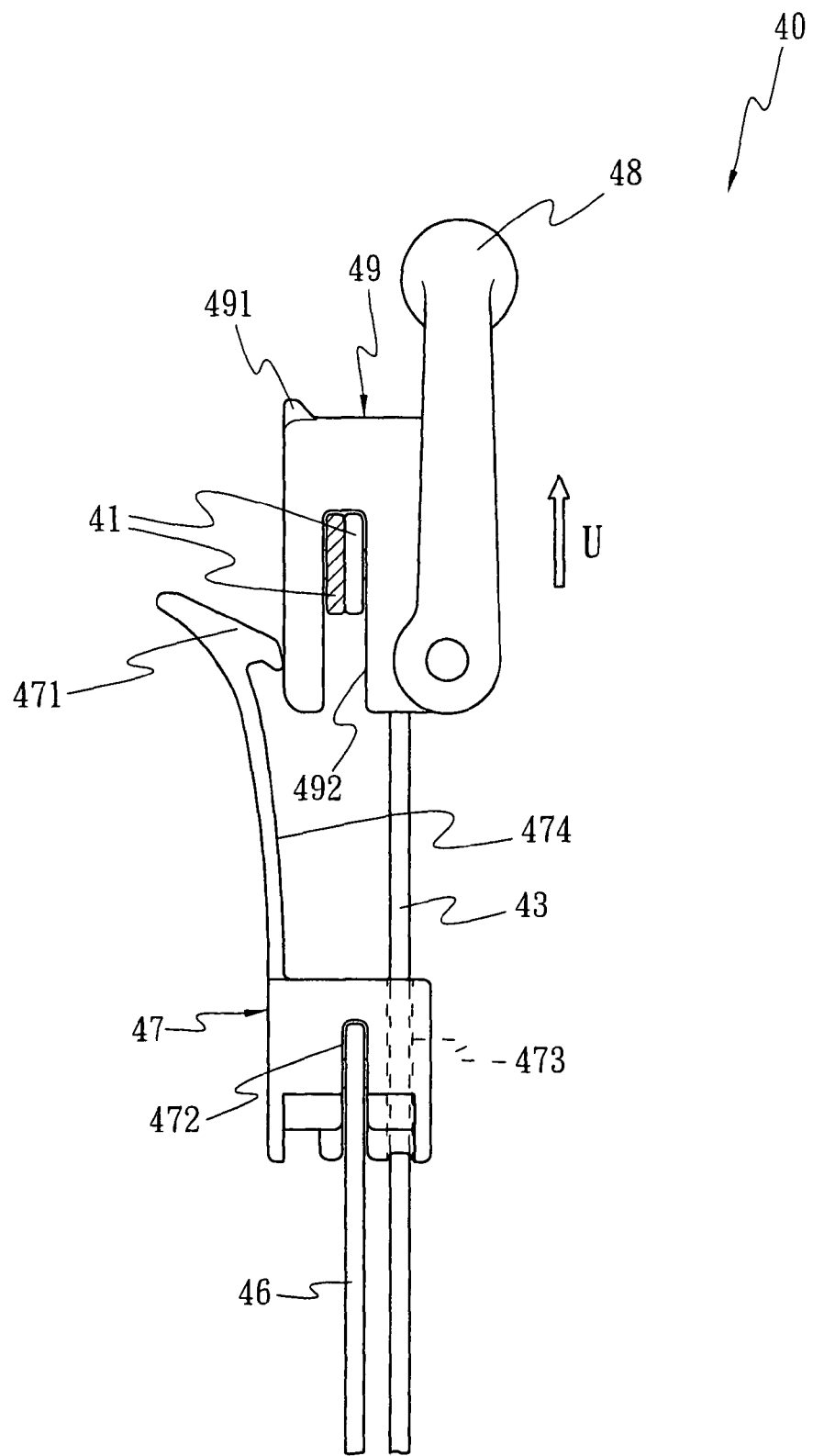
FIG. 11 is a partial side view showing the locking device for the stroller according to the second embodiment of the present invention while being in an unlocked state.
Figure 12:
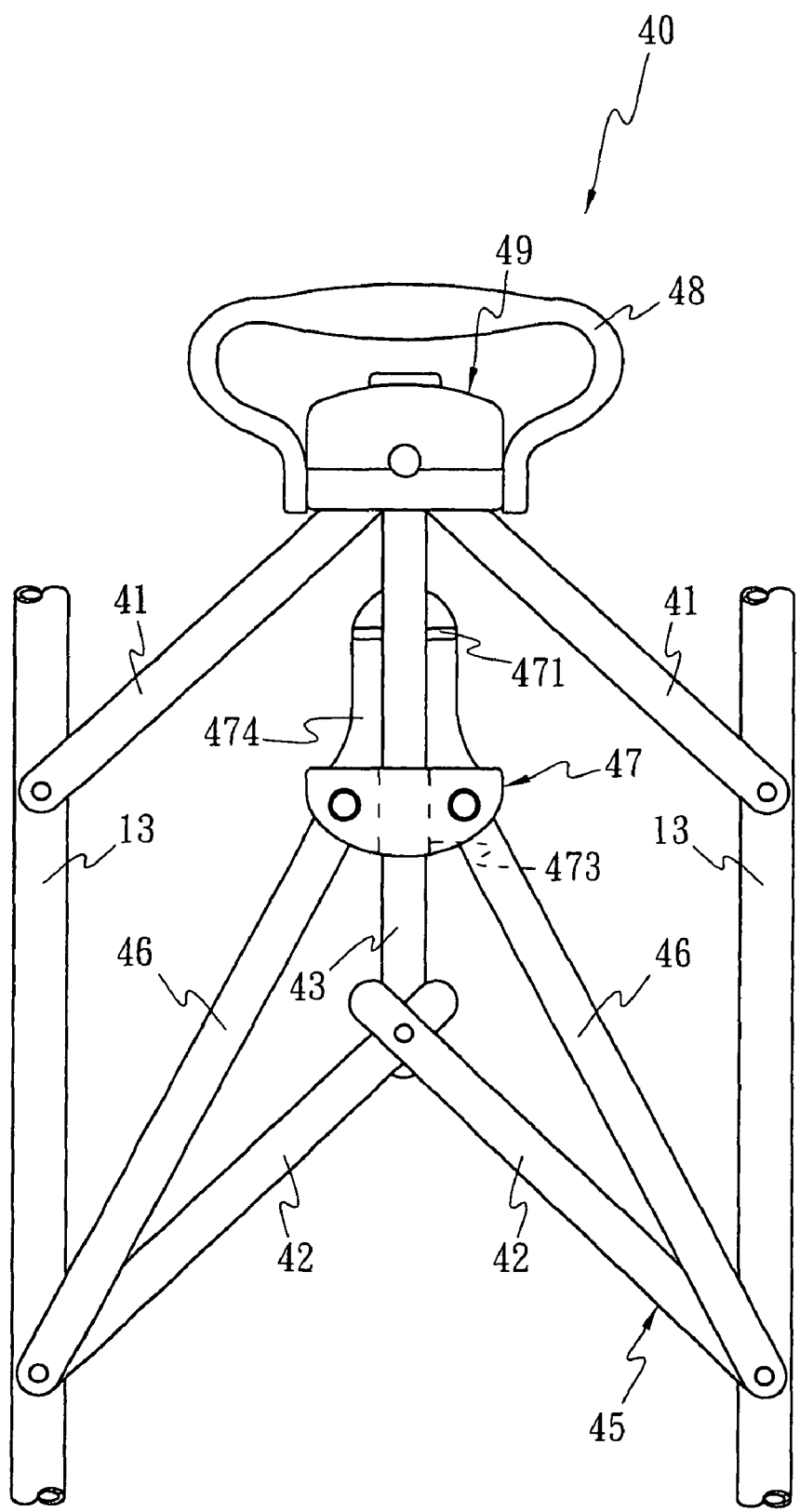
FIG. 12 is a partially front view showing the stroller in FIG. 8 while being in a semi-folded state.

When the stroller is intended to be folded, the user can press the latch 471 of the locking member 47 toward a direction designated by an arrow A shown in FIG. 10 to move the latch 471 of the locking member 47 away from the protrusion 491 of the operating member 49, and enable the handle 48 to pivot toward a direction designated by an arrow B shown in FIG. 10 and raise toward a direction designated by an arrow U shown in FIG. 11, such that the operating member 49 is moved upward and separated from the locking member 47 and the two rods of the base frame 20 is pivotally folded (not shown), thereby enabling the pair of side frames 10 to be close to each other and folded (see FIG. 12). In the meantime, by taking the first pivot member 15 as a pivot center, the second pivot member 14 is pivoted relative to the front lower frame 12, such that the rear frame 13 is pivoted relative to the front upper frame 11 about the second pivot member 14, thereby enabling the front upper frame 11, the front lower frame 12 and the rear frame 13 to be approached to each other while the frame is in a completely folded state as shown in FIG. 7.

When the stroller is intended to be unfolded, by taking the first pivot member 15 as a pivot center, the front upper frame 11 is pivoted in a clockwise direction CW as shown in FIG. 7 and the pair of side frames 10 are moved away from each other, such that the stroller is in an operation state and the protrusion 491 of the operating member 49 is abutted against the latch 471 of the locking member 47.

Figure 13:
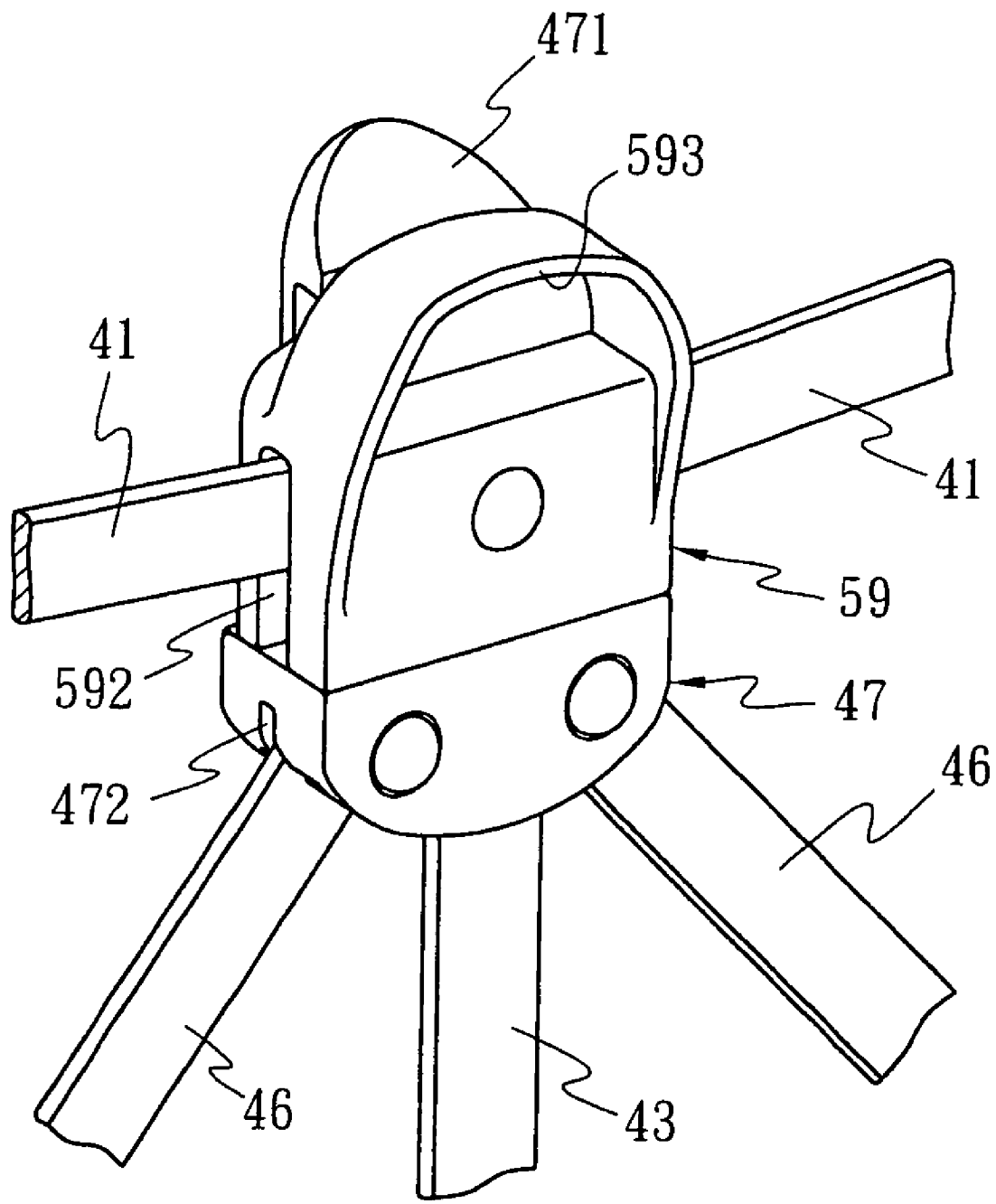
FIG. 13 is a partial perspective view of a locking device for a stroller according to a third embodiment of the present invention while being in a locked state.

Further, a locking device for a stroller according to a third embodiment of the present invention will be explained in reference to FIGS. 13 to 15. With respect to the locking member according to the second embodiment, the locking member according to the third embodiment is different only in the operating member. For the purpose of simplicity, the description of repetition is omitted. FIG. 13 is a partial perspective view of a locking device for the stroller according to a third embodiment of the present invention, in a locked state.

Figures 14, 15:
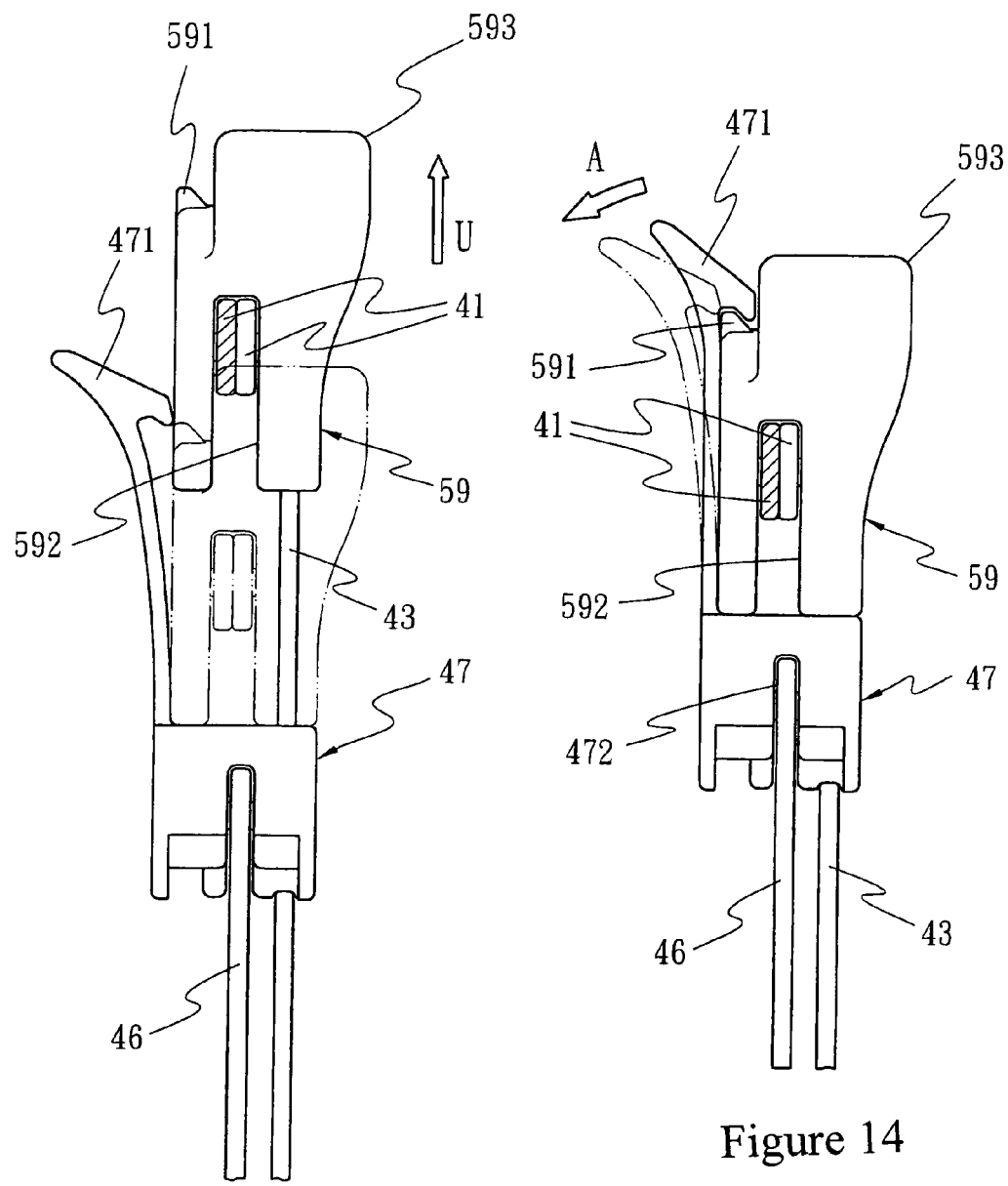
FIG. 14 is a partial side view of the locking device for the stroller according to the third embodiment of the present invention while being in an unlocked state.
FIG. 15 is a partial side view of the locking device for the stroller according to the third embodiment of the present invention while being in an unlocked state.

As shown in FIGS. 13 and 14, an operating member 59 has a protrusion 591 to be abutted against the latch 471 of the locking member 47 on the front side of the upper portion thereof, a recess on the rear side of the upper portion to integrally form with a grip 593 thereof, and a slot 592 for receiving the pivot end of the pair of upper braces 41 in the lower portion thereof. Similarly to the second embodiment, the upper end of the vertical brace 43 of the articulated mechanism 45 is fixed to the operating member 59 as well.

When the stroller is intended to be folded, the user can press the latch 471 of the locking member 47 toward a direction designated by an arrow A shown in FIG. 14 to move the latch 471 of the locking member 47 away from the protrusion 591 of the operating member 59, and hold and raise the grip 593 of the operating member 59 toward a direction designated by an arrow U shown in FIG. 15, such that the operating member 59 is moved upward and separated from the locking member 47. The other portion of the operation of the third embodiment is identical to that of the second embodiment, and thus the description of repetition is omitted.

Given the disclosure of the present invention, one skilled in the art would appreciate that there may be other embodiments and modifications within the scope of spirit of the present invention. Accordingly, all modifications attained by one skilled in the art from the present disclosure within the scope and spirits of the present invention are to be included as further embodiments of the present invention. The scope of the present invention accordingly is to be defined as set forth in the appended claims.

What is claimed is:

1. A locking device for a stroller, the stroller including a pair of side frames and a base frame, each of the side frames including a front upper frame, a front lower frame pivotally connected to the lower end of the front upper frame at the upper end thereof, a rear frame pivotally connected to the front upper frame at the upper end thereof, and a side connecting frame pivotally connected between the front lower frame and the rear frame, the base frame being pivotally connected between the pair of side frames, the locking device comprising:
   an articulated mechanism pivotally connected between the respective rear frames of the pair of side frames;
   a locking member slidably provided on the articulated mechanism for locking the articulated mechanism; and
   a pair of side braces pivotally connected to the locking member at one end thereof respectively and pivotally connected to the respective rear frames of the pair of side frames at the other end thereof,
   wherein the articulated mechanism includes a pair of upper braces, a pair of lower braces and a vertical brace, the pair of upper braces being pivotally connected to each other at one end thereof and pivotally connected to the respective rear frames of the pair of side frames at the other end thereof, the pair of lower braces being substantially parallel to the pair of upper braces and pivotally connected to each other at one end thereof and pivotally connected to the respective rear frames of the pair of side frames at the other end thereof, and the vertical brace being pivotally connected to the ends of the pair of upper braces at the upper end thereof and pivotally connected to the ends of the pair of lower braces at the lower end thereof,
   wherein the locking member is slidably provided on the vertical brace of the articulated mechanism, and has a latch integrally formed thereon that is abutted against an upper end of the vertical brace of the articulated mechanism, the latch including a latch body formed of a flexible and resilient material such that the latch is deformed against a restoring force of the latch body during a folding operation of the frames, and
   wherein the latch is operative to be removed from the upper end of the vertical brace of the articulated mechanism.

2. A locking device for a stroller according to claim 1, wherein the locking device further comprises a handle, and both ends of the handle are fixed to the pair of upper braces respectively.

3. A locking device for a stroller according to claim 1, wherein the locking member has a longitudinal body with a tapered upper portion, the latch is located on the upper portion, and the locking device has a recess below the latch for pivotally connecting the pair of upper braces and the vertical brace.

4. A locking device for a stroller, the stroller including a pair of side frames and a base frame, each of the side frames including a front upper frame, a front lower frame pivotally connected to the lower end of the front upper frame at the upper end thereof, a rear frame pivotally connected to the front upper frame at the upper end thereof, and a side connecting frame pivotally connected between the front lower frame and the rear frame, the base frame being pivotally connected between the pair of side frames, the locking device comprising:
   an articulated mechanism pivotally connected between the respective rear frames of the pair of side frames;
   a locking member slidably provided on the articulated mechanism for locking the articulated mechanism; and
   a pair of side braces pivotally connected to the locking member at one end thereof respectively and pivotally connected to the respective rear frames of the pair of side frames at the other end thereof, wherein the articulated mechanism includes a pair of upper braces, a pair of lower braces and a vertical brace, the pair of upper braces being pivotally connected to each other at one end thereof and pivotally connected to the respective rear frames of the pair of side frames at the other end thereof, the pair of lower braces being substantially parallel to the pair of upper braces and pivotally connected to each other at one end thereof and pivotally connected to the respective rear frames of the pair of side frames at the other end thereof, and the vertical brace being pivotally connected to the ends of the pair of upper braces at the upper end thereof and pivotally connected to the ends of the pair of lower braces at the lower end thereof, wherein the locking device further comprises an operating member having a protrusion, wherein the locking member is slidably provided on the vertical brace of the articulated mechanism, and has a latch integrally formed thereon that is abutted against the protrusion of the operating member of the articulated mechanism, the latch including a latch body formed of a flexible and resilient material such that the latch is deformed against a restoring force of the latch body during a folding operation of the frames, and wherein the latch is operative to be removed from the protrusion of the vertical brace of the articulated mechanism.

5. A locking device for a stroller according to claim 4, wherein the locking device further comprises a handle, and both ends of the handle are pivotally connected to both sides of the operating member.

6. A locking device for a stroller according to claim 4, wherein the operating member has a recess that is integrally formed with a grip.

7. A locking device for a stroller, the stroller including a pair of side frames each including a rear frame, the locking device being located between the two rear frames, the locking device comprising:

an articulated mechanism pivotally connected between the respective rear frames of the pair of side frames;

a locking member slidably provided on the articulated mechanism, the locking member having a latch integrally formed thereon for blocking the articulated mechanism to prevent the articulated mechanism from moving relative to the locking member, the latch including a latch body formed of a flexible and resilient material such that the latch is deformed against a restoring force of the latch body during a folding operation of the frames, wherein the latch is operative to be removed from the articulated mechanism to move the locking device with respective to the articulated mechanism such that the pair of side frames are close to each other, and wherein the articulated mechanism includes a pair of upper braces, a pair of lower braces and a vertical brace, the pair of upper braces being pivotally connected to each other at one end thereof and pivotally connected to the respective rear frames of the pair of side frames at the other end thereof, the pair of lower braces being substantially parallel to the pair of upper braces and pivotally connected to each other at one end thereof and pivotally connected to the respective rear frames of the pair of side frames at the other end thereof, and the vertical brace being pivotally connected to the ends of the pair of upper braces at the upper end thereof and pivotally connected to the ends of the pair of lower braces at the lower end thereof, and the locking member is slidably provided on the vertical brace of the articulated mechanism.

8. A locking device for a stroller, the stroller including a pair of side frames each including a rear frame, the locking device being located between the two rear frames, the locking device comprising:

an articulated mechanism pivotally connected between the respective rear frames of the pair of side frames;

a locking member slidably provided on the articulated mechanism, the locking member having a latch integrally formed thereon for blocking the articulated mechanism to prevent the articulated mechanism from moving relative to the locking member, the latch including a latch body formed of a flexible and resilient material such that the latch is deformed against a restoring force of the latch body during a folding operation of the frames, wherein the locking member has a longitudinal body with a tapered upper portion, the latch is located on the upper portion, and the locking device has a recess below the latch for receiving a pivot portion of a pair of upper braces and a vertical brace, and wherein the latch is operated to be removed from the articulated mechanism to move the locking device with respective to the articulated mechanism such that the pair of side frames are close to each other.

9. A locking device for a stroller according to claim 8, wherein the articulated mechanism includes a pair of upper braces, a pair of lower braces and a vertical brace, the pair of upper braces being pivotally connected to each other at one end thereof and pivotally connected to the respective rear frames of the pair of side frames at the other end thereof, the pair of lower braces being substantially parallel to the pair of upper braces and pivotally connected to each other at one end thereof and pivotally connected to the respective rear frames of the pair of side frames at the other end thereof, and the vertical brace being pivotally connected to the ends of the pair of upper braces at the upper end thereof and pivotally connected to the ends of the pair of lower braces at the lower end thereof, and the locking member is slidably provided on the vertical brace of the articulated mechanism.

10. A locking device for a stroller, the stroller having a pair of side frames, the locking device being pivotally connected to the side frames and comprising:

an articulated mechanism pivotally connected between the pair of side frames;

a locking member slidably mounted on the articulated mechanism, the locking member having a latch integrally formed thereon which is selectively moved between a first position where the latch stops the articulated mechanism from moving and the pair of side frames are spaced apart from each other, and a second position where the articulated mechanism is freely moved relative to the locking member and the side frames are able to be close to each other, wherein the latch including a latch body formed of a flexible and resilient material such that the latch is deformed against a restoring force of the latch body during a folding operation of the frames, wherein the articulated mechanism includes a pair of braces pivotally connected to each other at one end thereof and pivotally connected to the respective one of the pair of side frames at the other end thereof, and a vertical brace pivotally connected to the ends of the pair of braces and having an upper end, the locking member is slidably provided on the vertical brace of the articulated mechanism and the latch is abutted against the upper end of the vertical brace when the latch is in the first position, and wherein the upper end of the vertical brace is mounted on an operating member, and the latch is abutted against a protrusion on a top end of the operating member.

11. A locking device for a stroller according to claim 10, wherein the locking member has a longitudinal body with a tapered upper portion, the latch is located on the upper portion, and the locking device has a recess below the latch to retain the ends of the pair of braces and the upper end of the vertical brace therein while the latch is in the first position.

* * * * *